(12) United States Patent
Siegfriedsen

(10) Patent No.: US 11,486,362 B2
(45) Date of Patent: Nov. 1, 2022

(54) SINGLE-POINT MOORING WIND TURBINE

(71) Applicant: Aerodyn Consulting Singapore PTE LTD, Singapur (SG)

(72) Inventor: Sönke Siegfriedsen, Rendsburg (DE)

(73) Assignee: AERODYN CONSULTING SINGAPORE PTE LTD, Singapur (SG)

( * ) Notice: Subject to any disclaimer, the term of this patent is extended or adjusted under 35 U.S.C. 154(b) by 0 days.

(21) Appl. No.: 17/257,198

(22) PCT Filed: May 29, 2019

(86) PCT No.: PCT/IB2019/000458
§ 371 (c)(1),
(2) Date: Dec. 30, 2020

(87) PCT Pub. No.: WO2020/016643
PCT Pub. Date: Jan. 23, 2020

(65) Prior Publication Data
US 2021/0156360 A1    May 27, 2021

(30) Foreign Application Priority Data
Jul. 20, 2018   (DE) .................... 10 2018 117 647.3

(51) Int. Cl.
*F03D 13/25* (2016.01)

(52) U.S. Cl.
CPC .......... *F03D 13/25* (2016.05); *F05B 2230/80* (2013.01); *F05B 2240/93* (2013.01); *F05B 2240/95* (2013.01)

(58) Field of Classification Search
CPC ....................................................... F03D 13/25
See application file for complete search history.

(56) References Cited

U.S. PATENT DOCUMENTS

| | | | | |
|---|---|---|---|---|
| 7,075,189 B2 * | 7/2006 | Heronemus | ............. | F03D 9/255 290/44 |
| 7,612,462 B2 * | 11/2009 | Viterna | ................... | B63B 21/50 290/53 |
| 8,169,099 B2 * | 5/2012 | Roznitsky | ............... | F03D 13/40 290/44 |
| 8,373,299 B2 | 2/2013 | Sharples et al. | | |
| 8,471,396 B2 * | 6/2013 | Roddier | ................. | F03D 80/00 290/44 |
| 9,080,554 B2 | 7/2015 | Royseth | | |
| 9,879,649 B2 * | 1/2018 | Inoue | ...................... | F03B 17/06 |
| 9,938,960 B2 * | 4/2018 | Gabeiras | ................. | B63B 43/06 |
| 10,280,901 B2 * | 5/2019 | Saeki | ....................... | F03D 13/22 |
| 10,677,224 B2 * | 6/2020 | Cruse | ...................... | B63B 35/44 |
| 2010/0008733 A1 * | 1/2010 | Stiesdal | .................. | F03D 13/25 405/224 |

(Continued)

FOREIGN PATENT DOCUMENTS

DE    60131072    7/2008
DE    102013111115    1/2015

(Continued)

*Primary Examiner* — Justin D Seabe
(74) *Attorney, Agent, or Firm* — Diederiks & Whitelaw, PLC.

(57) ABSTRACT

The invention relates to a single-point mooring wind turbine having a rotor arranged on a tower, characterized by a design counteracting sway of the wind turbine caused by the rotor torque.

13 Claims, 6 Drawing Sheets

(56) References Cited

U.S. PATENT DOCUMENTS

2011/0140451 A1 6/2011 Sharples
2012/0093648 A1 4/2012 Røyseth

FOREIGN PATENT DOCUMENTS

| DE | 102014109212 | 1/2016 |
| DE | 102016118079 | 9/2017 |
| EP | 1269018 | 1/2003 |
| EP | 3019740 | 5/2016 |
| JP | 2015505006 | 2/2015 |
| JP | 2017515033 | 6/2017 |

* cited by examiner

SINGLE-POINT MOORING WIND TURBINE

CROSS-REFERENCE TO RELATED APPLICATIONS

This application is the National Stage of International Application No. PCT/IB2019/000458, filed 29 Mar. 2019, which claims priority from and benefit of German Patent Application No. 10 2018 117 647.3, filed 20 July 2018. The entire contents of these applications are incorporated herein by reference.

BACKGROUND OF THE PRESENT INVENTION

The invention relates to a single point mooring wind turbine with a rotor arranged on a tower. In particular, the invention relates to a single point mooring wind turbine with a floating foundation having at least two buoyancy bodies arranged in one plane.

Single point mooring wind turbines are known in particular from the US 2011 140 451 A1, EP 1 269 018 A1, DE 10 2013 111 115 B3, EP 3 019 740 B1 and DE 10 2016 118 079 B3. In particular, these plants have a floating foundation in common, which is mounted so that it can be rotated by only one single point, so that separate devices for wind direction tracking between the energy conversion unit and the tower head can be dispensed with due to this special type of anchorage. Rather, the wind direction tracking of these wind turbines, which are designed as leeward runners, takes place independently because the floating single point mooring wind turbine aligns itself with the wind, depending on the wind direction, around the anchorage with the wind. Analogous to the so-called swaying of a ship to and from an anchor buoy, the self-alignment of the turbine in the wind can also be described as swaying. The swaying of the floating wind turbine around the anchorage is almost mainly due to changes in the wind direction—changes in the flow direction of the water in which the wind turbine is anchored play only a minor role. According to the EP 3 019 740 B1, a self-aligning design in the wind also allows the loads occurring at the rotor or the energy conversion unit to be introduced directly into the foundation without bending moments occurring at the tower and from there directly into the anchorage and therefore into the bottom of the water in which the floating wind turbine is anchored.

The fundamental advantage of such turbines over multiple-anchored and thereby essentially non-rotatable turbines with an (active) wind tracking system at the tower head is that the single point mooring wind turbines can be formed with a significantly lower head weight due to the lack of a yaw system between tower and nacelle, which in turn reduces the constructive effort for the floating foundation supporting the tower with the rotor.

During the research and development of single point mooring wind turbines, the inventor of the present application became aware of the fact that such wind turbines tend, when in operation, to heel sideways in the direction of rotation of the rotor due to the torque of the rotor. In the case of large offshore turbines, this inclination angle $\alpha$ is in the order of 2° to probably 7°.

The inclination of the single point mooring wind turbine, in turn, means that in top view of the single point mooring wind turbine, the intended line between the anchor point (i.e. the pivot point) of the single point mooring wind turbine and the axis of the rotor of the turbine heeling to one side is no longer identical with the wind direction, so that a torque is formed around the anchor point and the entire turbine rotates out of the wind direction. If the direction of rotation is clockwise when viewed in wind direction, the turbine first tilts (heels) to the right and then turns the entire turbine to the left when viewed from above. The resulting deviation of the rotor axis from the wind direction reaches values between approx. 20° and approx. 40°, so that an (unacceptable) energy loss of up to 25-30% can be expected due to the wind direction deviation caused by the rotor torque.

For the purposes of this patent application, the anchor point is the pivot point of the single point mooring system.

The swaying of a floating single point mooring wind turbine in operation therefore has, in addition to the negligible part caused by changes in the water flow and a part caused by changes in the wind direction in order to maintain the operation of the turbine, also a part negatively affecting the efficiency of the turbine due to the rotor torque. In other words, the swaying of a floating single point mooring wind turbine is the result of the forces and moments acting on the turbine from the wind, the flow and the rotation of the rotor.

SUMMARY OF THE INVENTION

The object of the invention is therefore to create a particularly efficient single point mooring wind turbine.

This object is achieved by the single point mooring wind turbine having a rotor arranged on a tower, including a design which counteracts the swaying of the wind turbine caused by the rotor torque. This task is also solved by the method of putting into operation a single-point-mooring wind turbine anchored to an anchor point and freely rotatable around the anchor point, with a rotor arranged on a tower, including trimming the turbine in an inoperative state to compensate the torque generated by the rotor during operation in such a way that, in top view of the single point mooring wind turbine, the imaginary line between the anchor point and the rotor axis in the operating state of the single point mooring wind turbine is identical with the wind direction.

The basic idea of the invention is to design the turbine in such a way that, due to the assembly of the single point mooring wind turbine, constructional measures or the providing of certain additional equipment are taken to counteract the wind turbine's swaying around the anchor point caused by the rotor torque.

According to the invention, this can on the one hand be achieved constructively by the fact that the single point mooring wind turbine or parts thereof take up a first position from the outset without torque caused by the rotating rotor, i.e. out of operation of the turbine, which causes the rotor torque to cause the turbine to take up a second position during operation, in which the anchor point/pivot point and the rotor, in particular the rotor axis, lie in a line with the wind direction and corresponding to the rotor thrust in top view of the turbine. As the heeling of the turbine during operation, which is otherwise caused by the rotor torque, is compensated by the heeling of the turbine out of operation effected by the construction, the swaying of the single point mooring wind turbine around the anchor point deviating from the wind direction can be avoided or largely reduced.

This way—with reference to the nominal torque of the rotor—it can be preferably provided that the tower of the turbine is inclined forward by a predetermined angle of inclination in the opposite direction to the direction of rotation of the rotor, wherein the tower is erected in such a way that the anchor point and the rotor, in particular the rotor axis, lie on a line with the wind direction in top view of the turbine only when the torque caused by the rotor is produced.

In particular, therefore, the turbine must be designed so that the angle of inclination of the tower in the inoperative condition of the turbine, in the opposite direction to that of rotation of the rotor, is equal to the angle of inclination of the turbine in the operative condition in the direction of rotation of the rotor when the (nominal) torque caused by the rotor is applied. This design compensates for the impact of the torque caused by the rotor on the positioning of the turbine around the anchor point, thereby avoiding power losses.

According to another design, it is also possible in single point mooring wind turbines with at least two buoyancy bodies arranged on both sides of the rotor to give the buoyancy member arranged against the direction of rotation of the rotor preferably a greater weight than the buoyancy body arranged in the direction of rotation of the rotor. On the other hand, it is preferably conceivable to give the buoyancy member arranged in the direction of rotation of the rotor a greater buoyancy than the buoyancy body arranged against the direction of rotation of the rotor. The same desired effect can also be achieved by combining the two procedures.

As an alternative (or additional) to these general constructive measures, according to the invention, it is provided that the single point mooring wind turbine has a device that directly and functionally counteracts the torque of the rotor. In particular, the device has, or is designed as, a drive which generates a thrust which counteracts the swaying caused by the rotor torque and rotates the whole turbine around the anchor point against the swaying caused by the rotor torque. For example, a ship's engine and/or a maneuvering thruster can be used as the drive.

According to the invention, a single point mooring wind turbine with a rotor arranged on a tower is proposed, with a design that counteracts the swaying of the wind turbine caused by the rotor torque.

According to a preferred design of the invention, in particular a device is provided which counteracts the swaying of the wind turbine caused by the rotor torque.

The wind turbine designed or installed, according to the invention, preferably has a floating foundation with at least two buoyancy bodies arranged in one plane.

According to a first preferred design, the tower is inclined against the direction of rotation of the rotor to compensate for the swaying of the wind turbine caused by the rotor torque.

The tower is particularly preferred inclined towards the foundation.

The angle of inclination β of the tower to the horizontal is most preferably about $2° ≤ β ≤ 7°$.

According to a second preferred embodiment, the turbine has an additional weight on the side opposite to the direction of rotation of the rotor which at least partially compensates for the nominal torque of the rotor.

The same effect is also achieved by an alternative preferred design, in which the buoyancy body arranged in the direction of rotation of the rotor has a greater buoyancy than the buoyancy body arranged opposite to the direction of rotation.

The invention is particularly suitable for a wind turbine designed according to the EP 3 019 740 B1, in which a floating foundation with at least three buoyancy bodies arranged in one plane is provided, the tower base is arranged adjacent to one of the buoyancy bodies and the rotor is arranged between the other two buoyancy bodies and wherein the distance of the buoyancy body arranged in the direction of rotation from the rotor is greater than the distance of the buoyancy body arranged opposite the direction of rotation from the rotor. Alternatively, the distance of the buoyancy body to the rotor in the opposite direction of rotation may be less than the corresponding distance of the buoyancy body to the rotor in the direction of rotation.

Finally, a wind turbine is proposed in which the device has a drive which at least partially compensates for the swaying, in particular a ship's engine or a maneuvering thruster.

The design of a turbine according to the invention does not only have to have a single design feature that counteracts the rotor torque, but may also combine the above-mentioned embodiments in (partial) combinations in a single turbine.

For the erection and initial operation of a single point mooring wind turbine anchored to an anchor point and freely rotatable in order to anchor it, with a rotor arranged on a tower, it is proposed, according to the invention, to trim the turbine in the inoperative state in order to compensate for the torque generated by the rotor in operation (in particular with regard to the nominal torque of the rotor) in such a way that, in top view of the single point mooring wind turbine, the intended line between the anchor point and the rotor axis in the operating state of the single point mooring wind turbine is identical with the wind direction.

The wind direction is preferably defined as the local mean wind direction in terms of time and/or in the area of the single point mooring wind turbine.

The trimming is also preferably carried out by filling and/or emptying ballast water tanks with ballast water provided in or at the single point mooring wind turbine. Alternatively or additionally, the trimming of the turbine can also be carried out by attaching and/or removing weights.

BRIEF DESCRIPTION OF THE DRAWINGS

The invention is explained in more detail by a particularly preferentially designed exemplary embodiment shown in the attached drawings, In which.

DETAILED DESCRIPTION OF THE PREFERRED EMBODIMENTS

FIG. 1a shows a schematic front view in wind direction of a particularly preferred floating wind turbine 100 according to the prior art, wherein the same turbine 100 is represented in FIG. 1b again in top view. The turbine 100 is formed as single point mooring wind turbine 100, wherein the anchor point or pivot point 200 of the turbine 100—as known from the DE 10 2016 118 079 B3—is located at the free end of the long arm of the floating foundation of the floating wind turbine 100. Also visible are the anchor lines 210 anchoring the wind turbine 100 to the bottom of the water and the submarine cable 220 connecting the wind turbine to the electrical grid.

Figure 1:
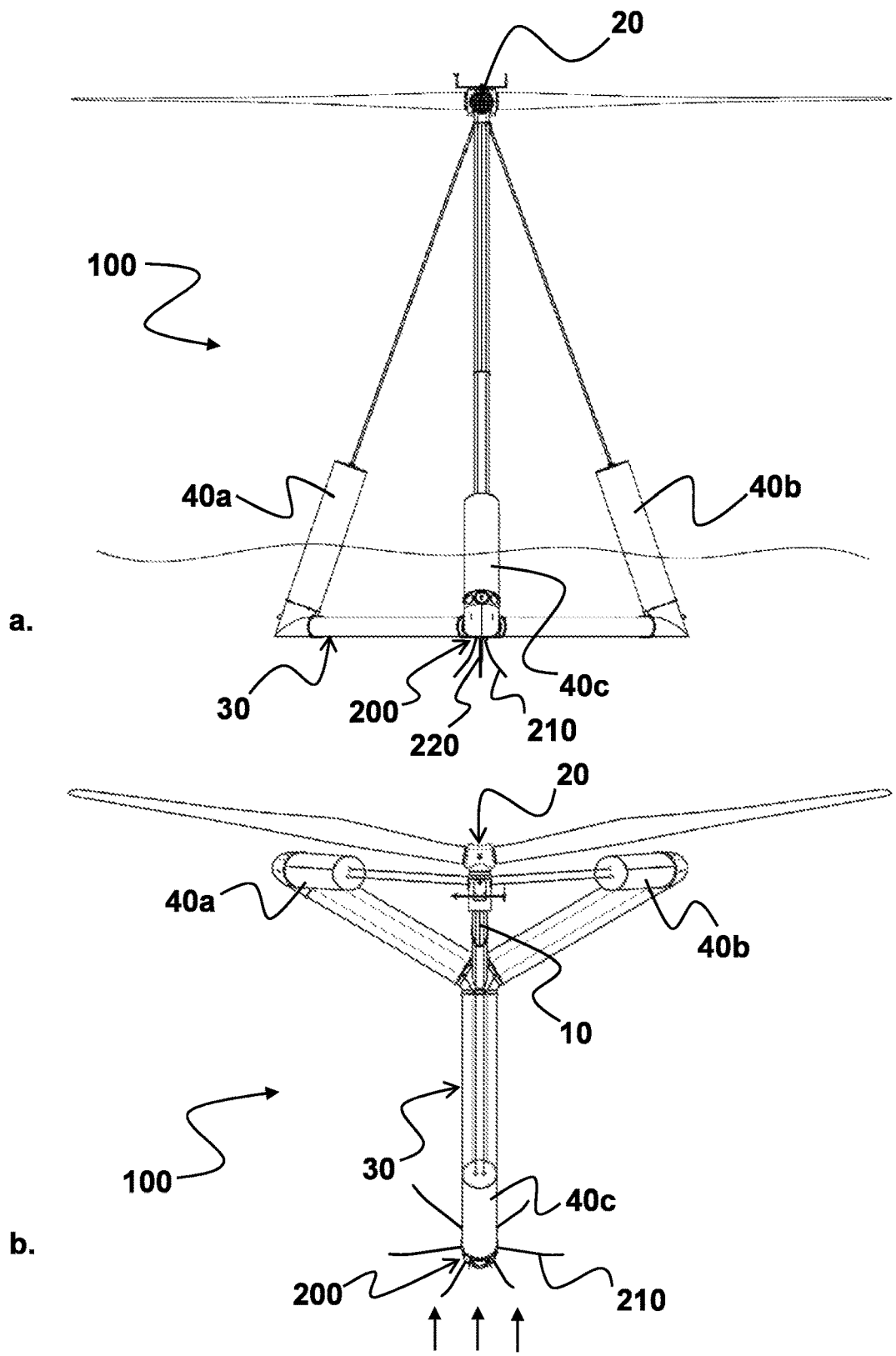
FIG. 1 (a) shows a schematic front view in wind direction of a floating wind turbine in a torque-free condition and (b) a top view of the floating wind turbine in a torque-free condition.

In the example shown, the wind turbine 100 is not in operation and, as shown in FIG. 1, is trimmed in such a way that the floating foundation is essentially aligned horizontally so that the tower of the wind turbine 100 with the anchor point 200 is aligned exactly in wind direction (see arrows).

Figure 2:
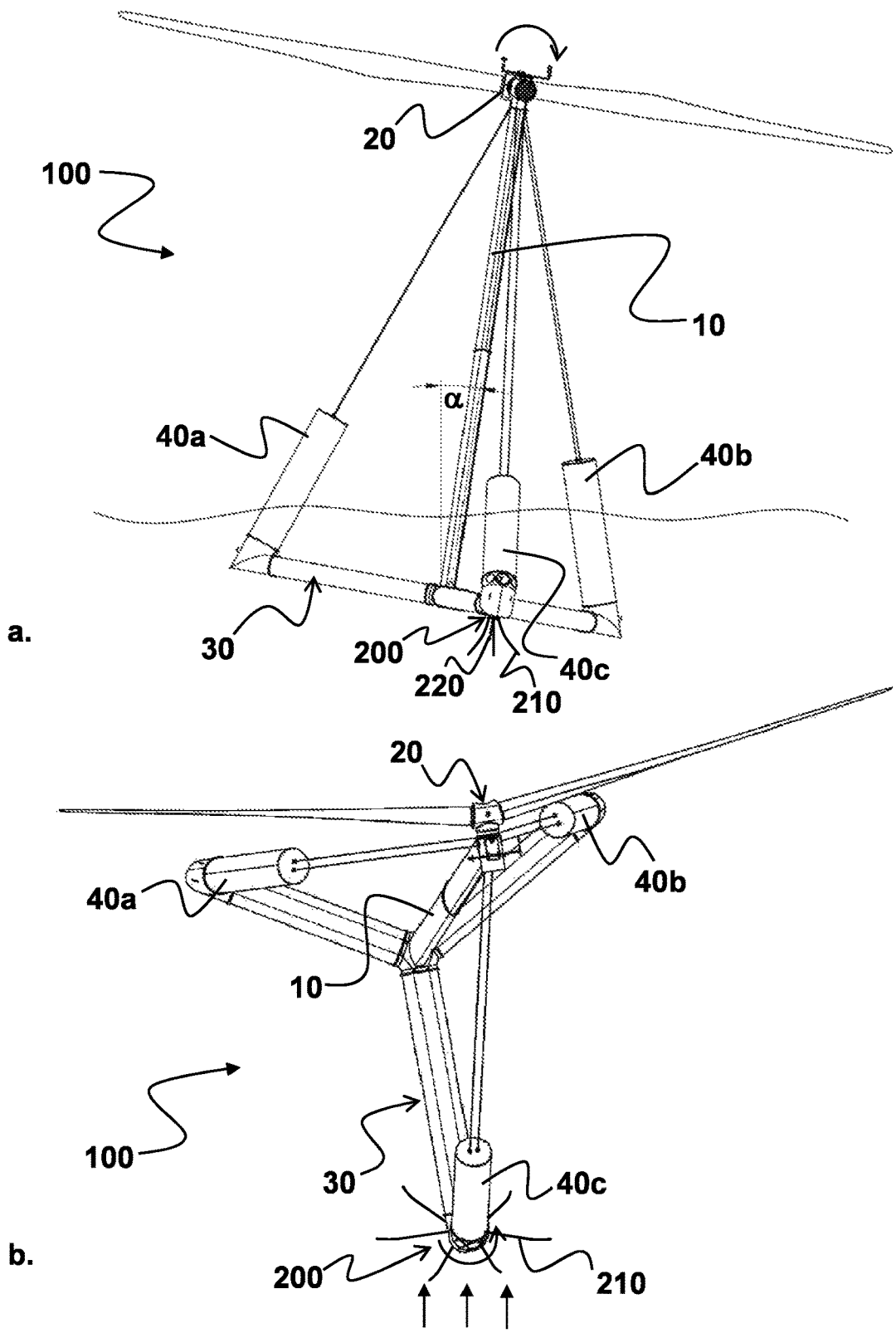
FIG. 2 (a) schematic front view in wind direction of the floating wind turbine from FIG. 1 in operating condition with rotor torque and (b) a schematic top view of the floating wind turbine from FIG. 1 in operating condition with rotor torque.

If, however, the single point mooring wind turbine 100 is in operation with torque generation, it can be observed that the turbine 100 heels in the direction of rotation of the rotor by an angle α and sways out of the wind in the opposite direction to the direction of rotation around the pivot point 200 of the turbine 100, i.e. the anchorage of the turbine 100, with an unchanged wind direction (and flow direction). Contrary to the general assumption, a single point mooring wind turbine 100 actually takes up the position shown in FIG. 2 when the wind direction is unchanged from FIG. 1, due to the swaying caused by the rotor torque. It is obvious that this swaying of the wind turbine caused by the rotor torque results in energy losses.

This phenomenon of torque yaw coupling occurs as a result of the design exclusively in floating wind turbines with a "single point mooring" anchorage, where the entire turbine can rotate in the water without resilient restoring forces and only with water damping, preferably via a rotary connection on or in the foundation.

FIG. 3a shows a schematic front view of a floating single point mooring wind turbine aligned in wind direction according to a first exemplary embodiment in a torque-free condition, wherein FIG. 3b represents a schematic top view of the floating single point mooring wind turbine.

Figure 3:
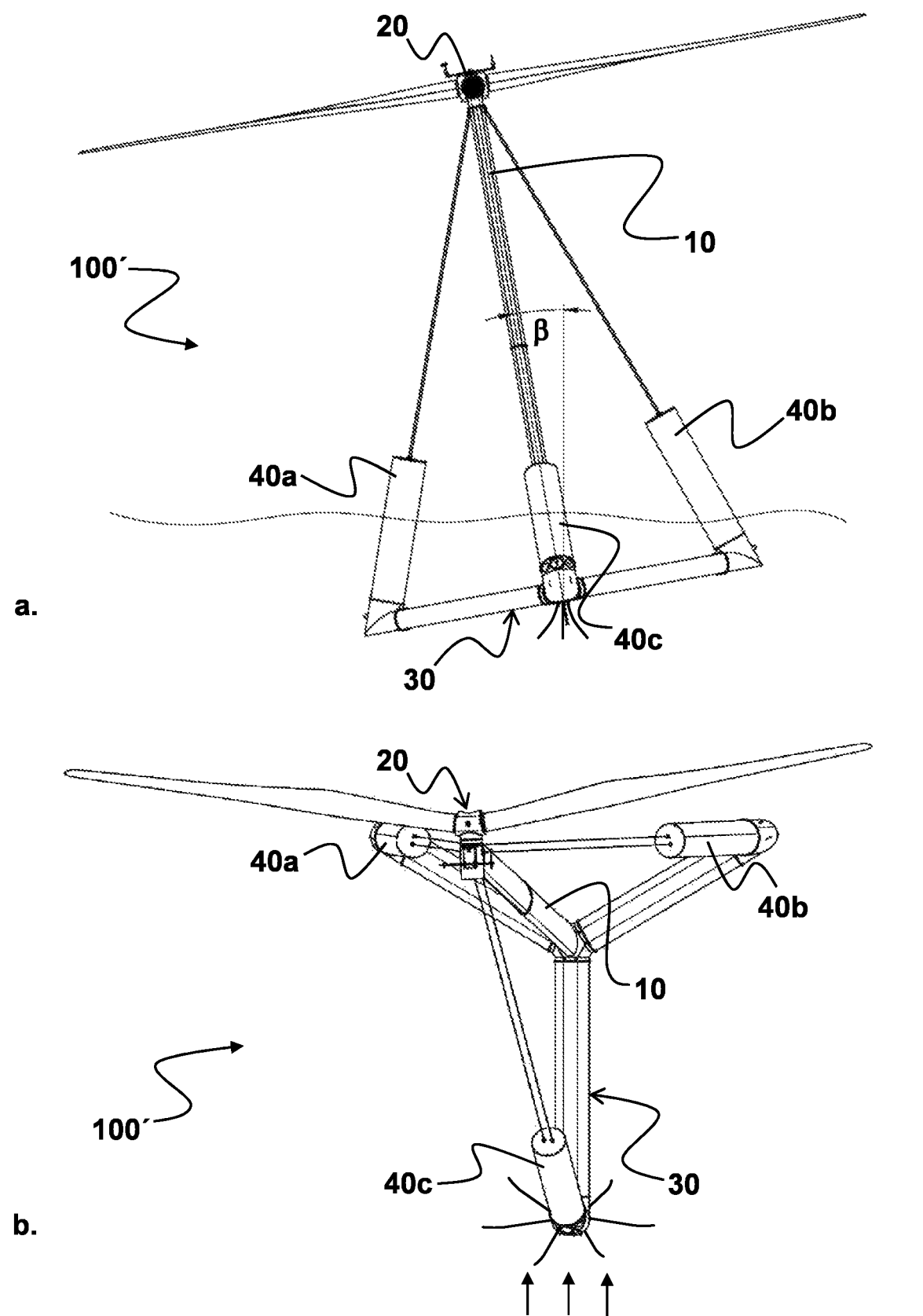
FIG. 3(a) shows a schematic front view in wind direction of a floating wind turbine according to a first exemplary embodiment with the embodiment according to the invention in a torque-free state and (b) a schematic top view of this floating wind turbine.

The single point mooring wind turbine 100' shown in FIG. 3 is essentially identical in construction to the one used in the well-known floating wind turbine. The single point mooring wind turbine 100' has a rotor 20 arranged on a tower 10, wherein the tower 10 is arranged on a foundation 30, which has three buoyancy bodies 40a, 40b, 40c. The foundation 30 is Y-shaped, wherein a respective buoyancy body 40a, 40b, 40c is located at the respective free end of one arm of the Y-shaped foundation structure. The long arm carrying the 40c buoyancy body forms the symmetry axis of the single point mooring wind turbine 100', wherein the tower 10 is arranged in the symmetry axis and inclined leeward.

However, it is not known and not provided for, according to the invention, that the single point mooring wind turbine 100' is trimmed at the latest after connecting it to the anchor point 200, but in any case before putting it into operation in such a way that the tower 10 is inclined by a predetermined angle of inclination β against the direction of rotation of the rotor 20, so that the single point mooring wind turbine 100' heels by about 5°.

As FIG. 3b clearly shows in top view of the single point mooring wind turbine 100', the rotor axis is therefore clearly outside the symmetry axis of the turbine formed by the long arm of the foundation 30.

Figure 4:
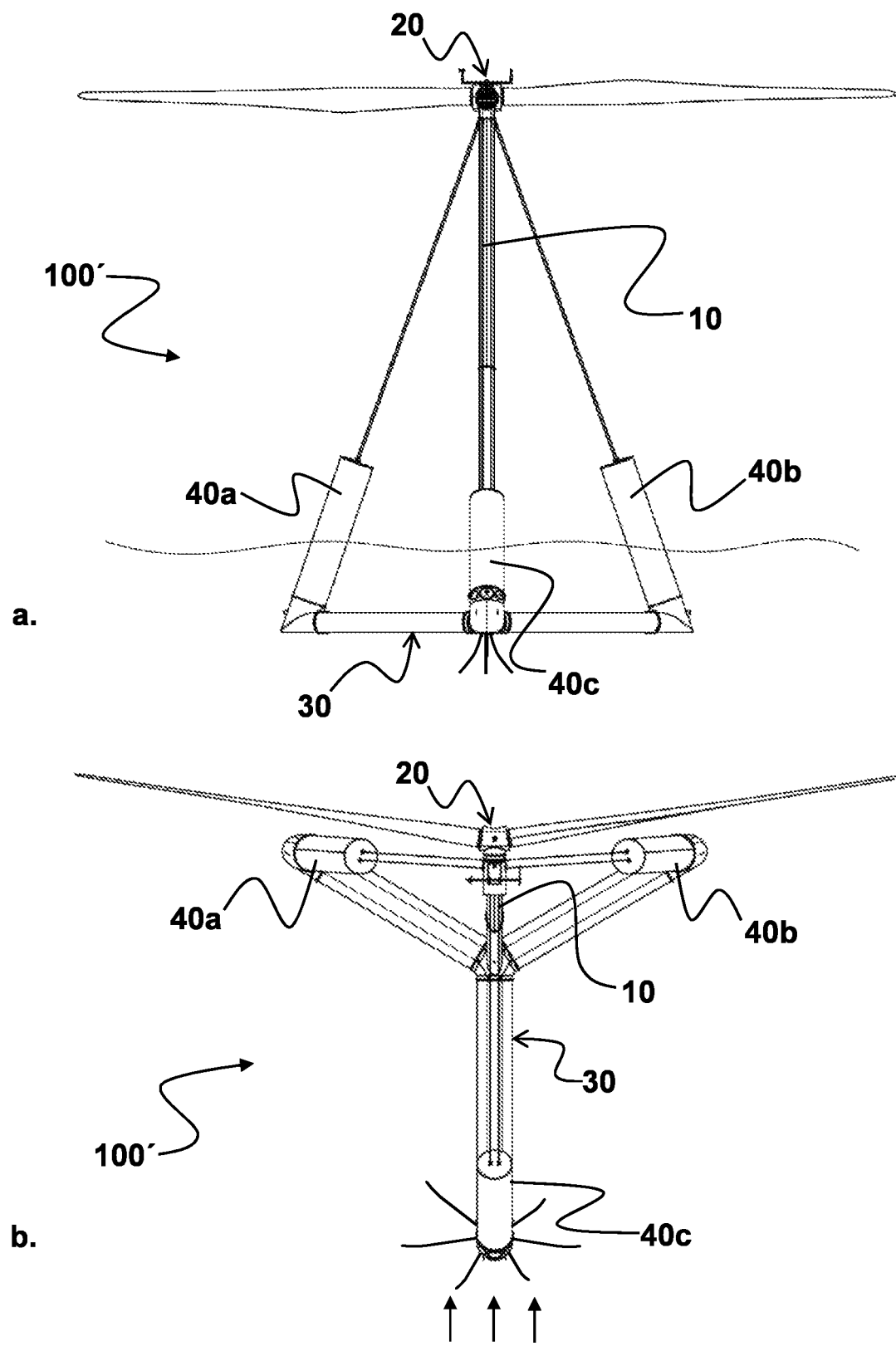
FIG. 4(a) shows a schematic front view of the floating wind turbine from FIG. 3 in the operating condition with rotor torque and (b) a schematic top view of this floating wind turbine with the embodiment according to the invention in the operating condition with rotor torque.

However, if the single-point mooring wind turbine 100' is put into operation, the turbine straightens up by the previously determined angle of inclination due to the torque generated by the rotor 20, so that—as FIG. 4a and FIG. 4b clearly show—in top view of the single point mooring wind turbine 100' the intended line between the anchor point 200 and the rotor axis in the operating condition of the single point mooring wind turbine 100' is identical with the wind direction.

Figure 8:
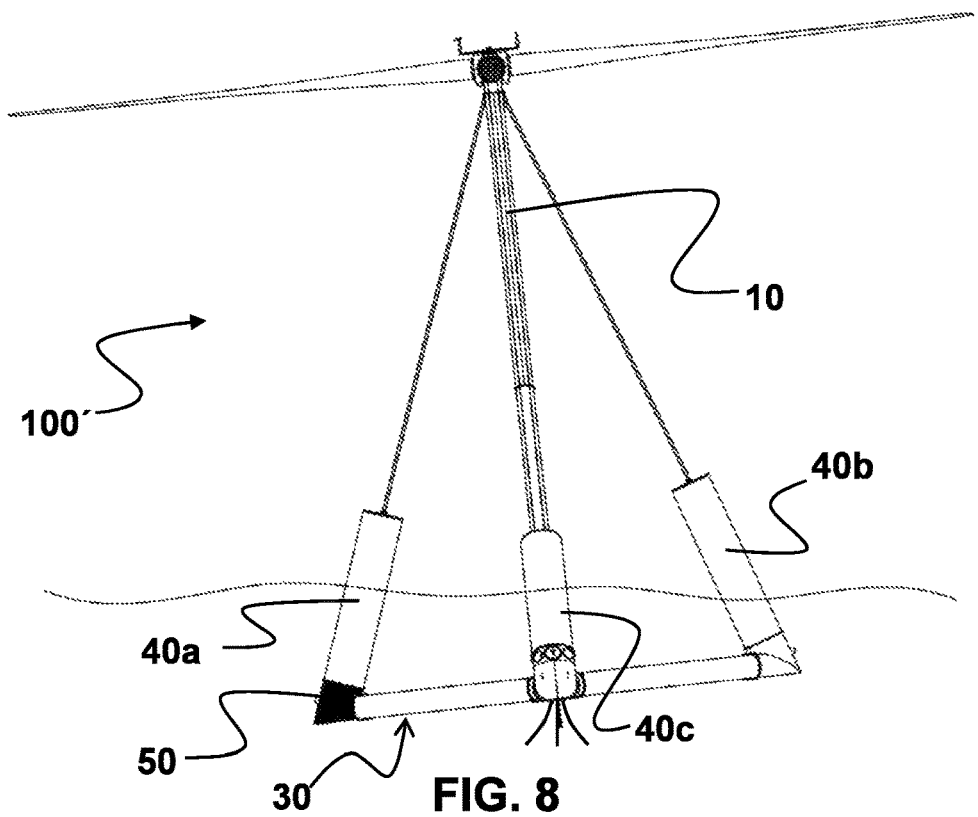
FIG. 8 shows a structure of a floating wind turbine according to the first exemplary embodiment, with which the required misalignment is generated by attaching an additional weight.

The heeling of the turbine in the inoperative state with a predetermined angle of inclination β counteracting the nominal torque of the rotor 20 can be caused in different ways:

On the one hand—as represented in FIG. 8—the part of the single point mooring wind turbine 100' opposite to the direction of rotation of the rotor with respect to the axis of symmetry, in particular the foundation 30 or the buoyancy body 40a, can be formed with a higher weight than the part of the single point mooring wind turbine 100' in the direction of rotation. In particular, FIG. 8 shows that the required misalignment, measured on the axis intended to be the pivot point rotor during operation, can be generated by attaching an additional weight on the side of the wind turbine opposite the direction of rotation of the rotor—for example by providing an additional weight 50 arranged at the free end of the arm carrying the buoyancy body 40a, in particular below the buoyancy body 40a.

Finally, FIG. 8 shows a structure of a floating wind turbine 100' according to the first exemplary embodiment, in which—as previously represented—the required misalignment measured on the axis of the pivot point rotor intended during operation is generated by attaching an additional weight on the side of the wind turbine opposite to the direction of rotation of the rotor.

On the other hand, the angle of inclination adopted in the inoperative state of the turbine 100' can also be attained by trimming the turbine 100' due to the distribution of ballast water in the foundation 30 and/or the buoyancy bodies 40a, 40b.

Figure 5:
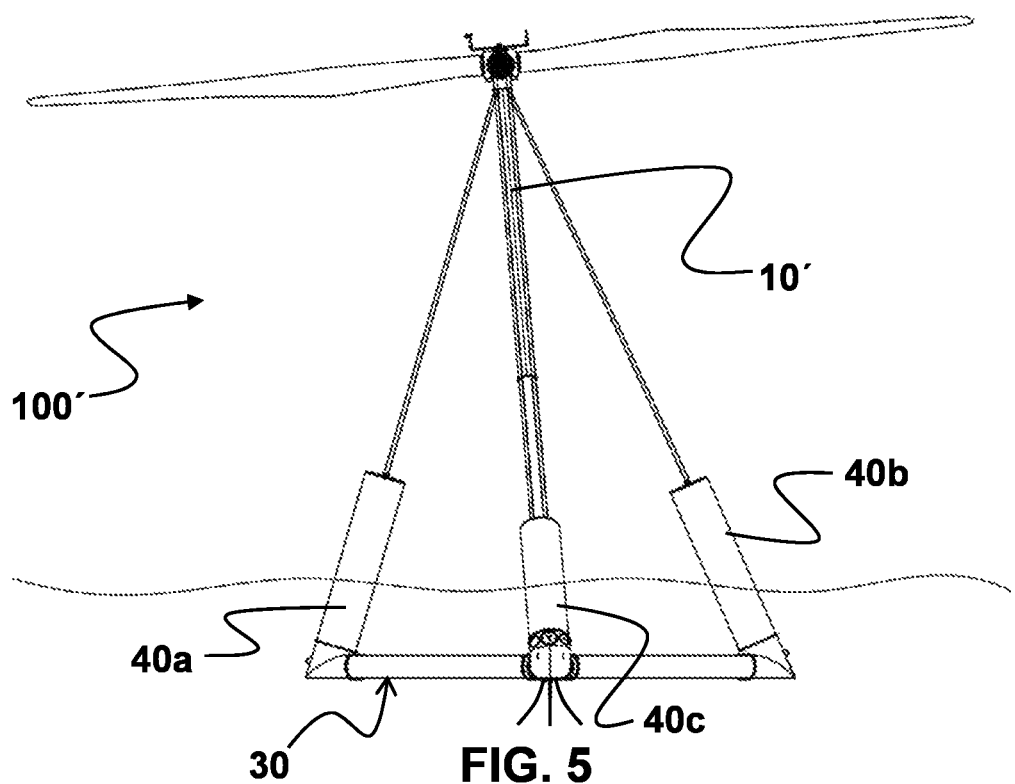
FIG. 5 shows a construction executed according to a particularly preferentially designed second exemplary embodiment with a tower offset at an angle to the foundation.

An alternative solution is represented in FIG. 5, in which the tower 10 of the single point mooring wind turbine 100' is inclined from the outset towards the well-known Y-shaped foundation 30 in the direction of the buoyancy body 40a opposite to the direction of rotation of the rotor 20. The tower 10 is therefore inclined with respect to the foundation 30 by a predetermined amount, which corresponds to the angle α which the turbine 100' tilts overall during operation with torque applied by the rotor 20.

Figure 6:
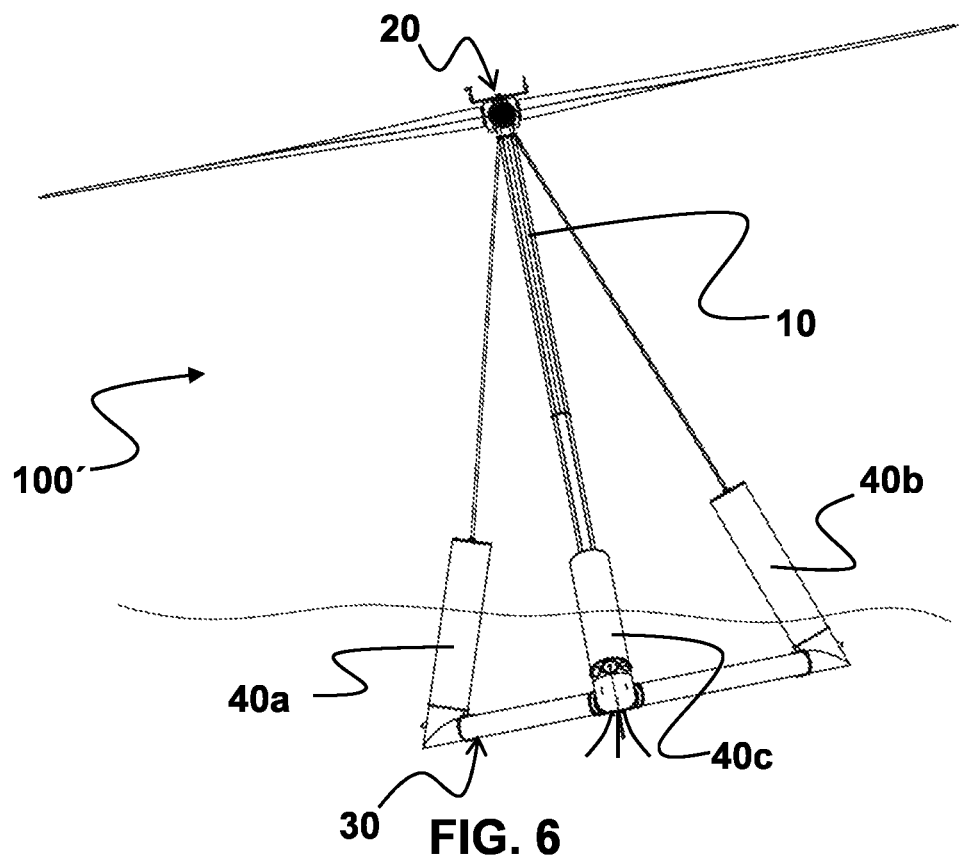
FIG. 6 shows a structure of a floating wind turbine according to a third exemplary embodiment with different distances of the floats arranged to the axis of symmetry.

FIG. 6 shows a structure of a floating wind turbine 100' according to a third embodiment example with different distances to the intended axis of the anchor point arranged buoyancy bodies 40a, 40b.

On closer inspection, it can be seen that the distance of the right buoyancy body 40 in the wind direction from the axis in which the tower 10 is inclined in the wind direction is greater than the distance of the left buoyancy body 40*a* in the wind direction. The buoyancy bodies 40*a*, 40*b* are formed identically as well. Due to the greater effective distance between the buoyancy body arranged in the direction of rotation of the rotor 20 and the aforementioned axis, a lever is created which is designed to counteract the rotor torque which would otherwise cause the turbine 100 to heel.

Figure 7:
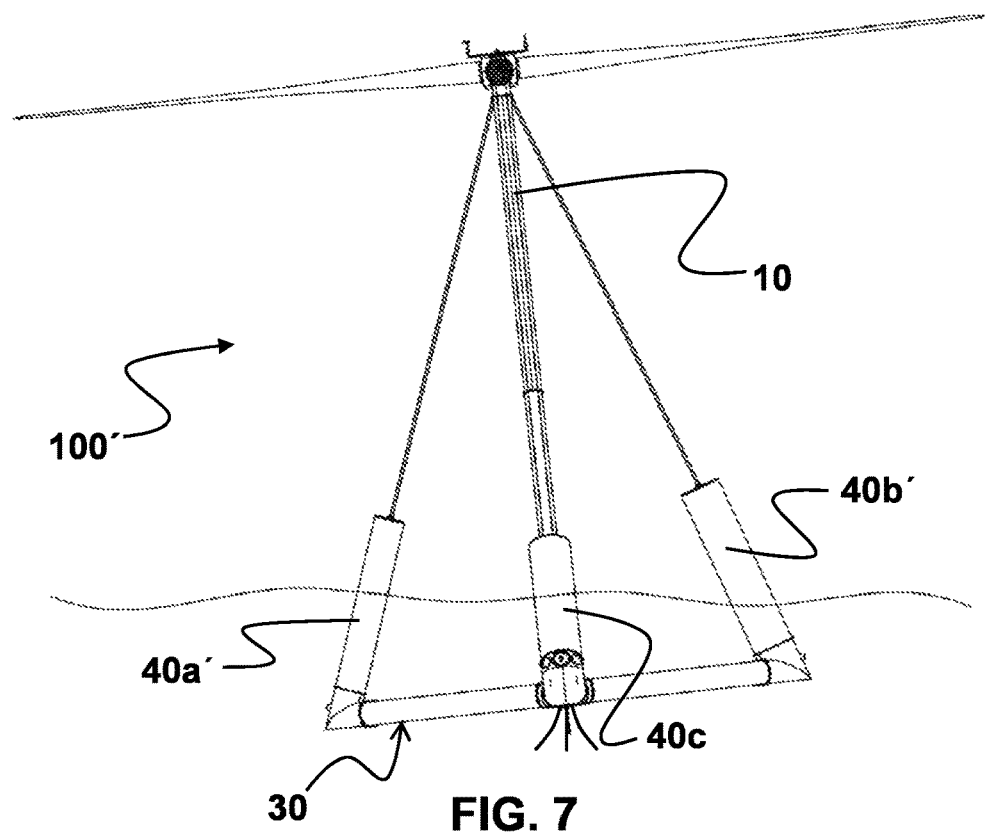
FIG. 7 shows a structure of a floating wind turbine according to a fourth exemplary embodiment with different waterline areas of the floats arranged to the axis of symmetry.

FIG. 7 shows a structure of a floating wind turbine 100' according to a fourth embodiment example with different waterline areas of the buoyancy bodies 40*a*, 40*b*, 40*c* arranged to the symmetry axis of the wind turbine.

Here it can be seen that the floating body 40*b'*—arranged in the direction of rotor rotation as shown—is formed in such a way that it generates a greater buoyancy than the floating body 40*a'* arranged in the opposite direction of rotor rotation. The latter mentioned floating body 40*a'* can generate the same buoyancy as the floating body 40*c* arranged at the pivot point of the turbine 100' or the floating body 40*b'* arranged in the direction of rotation of the rotor generates the same buoyancy as the floating body 40*c* arranged at the pivot point of the turbine 100', wherein only the buoyancy of the floating body 40*a'* arranged against the direction of rotation of the rotor is reduced.

The only important thing is that the turbine 100' is trimmed in such a way that the turbine 100' is essentially aligned horizontally during operation and that the intended line from the pivot point to the rotor is identical with the wind direction.

The invention claimed is:

1. A single point mooring wind turbine comprising:
   a foundation configured to float on water and having at least two buoyancy bodies arranged in one plane and a single anchor point,
   a tower arranged on the foundation, and
   a rotor arranged on the tower and having a direction of rotation,
   wherein the single point mooring wind turbine is freely rotatable about the single anchor point and, in operation, tends to begin swaying along a surface of the water in a curved path around the single anchor point due to the torque of the rotor, wherein the single point mooring wind turbine is configured with the tower inclined relative to the foundation contrary to the direction of rotation of the rotor, when the rotor is not moving, to counteract the swaying of the wind turbine caused by the rotor torque, when the rotor is moving.

2. The wind turbine according to claim 1, wherein the tower is inclined at an angle of 2° <β<7°.

3. The wind turbine according to claim 1, wherein the wind turbine has, on the side opposite the direction of rotation of the rotor, a weight which at least partially compensates for a nominal torque of the rotor.

4. The wind turbine according to claim 1, wherein the buoyancy bodies include a buoyancy body arranged in the direction of rotation of the rotor having a greater buoyancy than a buoyancy body arranged opposite to the direction of rotation.

5. The wind turbine according to claim 1, further comprising a drive which generates a thrust which counteracts the swaying caused by the rotor torque.

6. A method for commissioning a single point mooring wind turbine which has a foundation configured to float on water and having at least two buoyancy bodies arranged in one plane and a single anchor point and is freely rotatable about the anchor point, with a tower arranged on the foundation and a rotor arranged on the tower, wherein the wind turbine tends to begin swaying along a surface of the water in a curved path around the anchor point due to the torque of the rotor, said method comprising:
   Trimming the turbine in an inoperative state, wherein the rotor is not turning, by inclining the tower relative to the foundation contrary to the direction of rotation of the rotor to compensate for the torque generated by the rotor during operation, wherein the rotor is moving, in such a way that, in top view of the single point mooring wind turbine, an imaginary line between the anchor point and a rotor axis in an operating state of the single point mooring wind turbine is identical with a wind direction, to counteract the swaying of the wind turbine around the anchor point due to the torque of the rotor.

7. The method according to claim 6, wherein the wind direction is a local mean wind direction in time and/or in an area of the single point mooring wind turbine.

8. The method according to claim 6, wherein the trimming is carried out by filling and/or emptying ballast water tanks with ballast water provided in or at the single point mooring wind turbine.

9. The method according to claim 6, wherein the trimming is carried out by applying and/or removing weights.

10. The wind turbine according to claim 1, wherein the single anchor point is configured to be attached to an anchor line.

11. A single point mooring wind turbine comprising:
    a foundation configured to float on water and having at least two buoyancy bodies arranged in one plane and a single anchor point,
    a tower arranged on the foundation, and
    a rotor arranged on the tower and having a direction of rotation, wherein the single point mooring wind turbine is freely rotatable about the single anchor point and, in operation, tends to begin swaying along a surface of the water in a curved path around the single anchor point due to the torque of the rotor, wherein the single point mooring wind turbine is configured to at least partially compensate for the nominal torque of the rotor to counteract the swaying of the wind turbine caused by the rotor torque with either:
    a weight provided on the opposite side to the direction of rotation of the rotor, or
    the at least two buoyancy bodies including a buoyancy body arranged in the direction of rotation of the rotor that has a greater buoyancy than a buoyancy body arranged opposite the direction of rotation of the rotor.

12. The wind turbine according to claim 11, further comprising the weight provided on the opposite side to the direction of rotation of the rotor.

13. The wind turbine according to claim 11, further comprising the at least two buoyancy bodies including a buoyancy body arranged in the direction of rotation of the rotor that has a greater buoyancy than a buoyancy body arranged opposite the direction of rotation of the rotor.

* * * * *